(12) United States Patent
Takahashi

(10) Patent No.: US 7,324,343 B2
(45) Date of Patent: Jan. 29, 2008

(54) THERMALLY CONDUCTIVE HOLDER

(75) Inventor: Kouya Takahashi, Saitama (JP)

(73) Assignee: Polymatech Co., Ltd., Tokyo (JP)

( * ) Notice: Subject to any disclaimer, the term of this patent is extended or adjusted under 35 U.S.C. 154(b) by 514 days.

(21) Appl. No.: 10/894,522

(22) Filed: Jul. 20, 2004

(65) Prior Publication Data
US 2005/0022966 A1    Feb. 3, 2005

(30) Foreign Application Priority Data
Jul. 22, 2003    (JP) .............................. 2003-277645

(51) Int. Cl.
*H05K 7/20*    (2006.01)
*C08L 11/00*    (2006.01)

(52) U.S. Cl. ...................... 361/708; 361/704; 524/433; 524/779

(58) Field of Classification Search ................ 361/704, 361/708; 524/433, 779
See application file for complete search history.

(56) References Cited

U.S. PATENT DOCUMENTS 5,167,851 A * 12/1992 Jamison et al. ............... 252/74
5,424,352 A   6/1995 Watanabe
6,284,817 B1 * 9/2001 Cross et al. ................ 523/220
6,380,301 B1   4/2002 Enami et al.
6,444,740 B1 * 9/2002 DeCato et al. .............. 524/425

FOREIGN PATENT DOCUMENTS

| JP | 6-293861 A | 10/1994 |
| JP | 11-273643 A | 10/1999 |
| KR | 2001-0051681 A | 6/2001 |

* cited by examiner

*Primary Examiner*—Jayprakash Gandhi
*Assistant Examiner*—Zachary M Pape
(74) *Attorney, Agent, or Firm*—Crompton, Seager & Tufte, LLC

(57) ABSTRACT

The present invention provides a thermally conductive holder for holding a heat-generating component. The thermally conductive holder comprising a material formed from a thermally conductive composition. The thermally conductive composition includes a silicone rubber; and a thermally conductive filler in a range of 40 to 70 percent by volume with respect to total volume of the silicone rubber and the thermally conductive filler. From 35 to 100 percent by volume of the thermally conductive filler is composed of magnesium oxide of 5 μm or less in average particle size. Said material has a hardness in a range of 20 to 70 as measured by a Type A durometer in conformity with ISO 7619.

18 Claims, 4 Drawing Sheets

THERMALLY CONDUCTIVE HOLDER

BACKGROUND OF THE INVENTION

The present invention relates to a thermally conductive holder for holding a heat-generating component such as a battery.

In recent years, there have been demands in the field of electronic equipment for realizing not only its miniaturization and better performance, but also its availability for a longer period of time. With such demands, in the field of batteries mounted in electronic equipment, efforts have been directed toward their miniaturization as well as an increase in their capacity. As a result, the power consumption from the batteries has been increased, causing a larger amount of heat to be generated from the batteries.

Traditionally, to protect such batteries, a cushion member formed in a sheet has been sometimes provided around them. Japanese Patent Laid-Open No. 11-273643, for example, discloses a cushion member formed of a thermally conductive elastic material. This cushion member is inserted between a battery and a housing for accommodating the battery so as to cushion vibration from the outside. At the same time, the cushion conducts heat generated from the battery to the housing so that the housing radiates the heat, thereby inhibiting the battery's performance from degrading due to the heat.

Recently, there has also been proposed a holder, as a thermally conductive cushion member, which is formed into a shape conforming to the profile of a battery and mounted on the battery to be used.

A rubber material is used as a base material for the holder above described, because it facilitates easy mounting of the holder onto a heat-generating component such as battery and excels in cushioning action. It is required for improving thermal conductivity of the holder to incorporate a large amount of thermally conductive filler into the rubber material.

However, inclusion of the large amount of thermally conductive filler into the rubber material can decrease the elasticity of the rubber of the holder to be obtained, which results in difficulty in mounting the holder on a heat-generating component.

To deal with the above-mentioned disadvantages, an objective of the present invention is to provide a thermally conductive holder that has excellent thermal conductivity, and is easy to mount on a heat-generating component.

BRIEF SUMMARY OF THE INVENTION

The present invention provides a thermally conductive holder for holding a heat-generating component. The thermally conductive holder comprises a material formed from a thermally conductive composition. The thermally conductive composition includes a silicone rubber; and a thermally conductive filler in a range of 40 to 70 percent by volume with respect to total volume of the silicone rubber and the thermally conductive filler. From 35 to 100 percent by volume of the thermally conductive filler is composed of magnesium oxide of 5 µm or less in average particle size. Said material has a hardness in a range of 20 to 70 as measured by a Type A durometer in conformity with ISO 7619.

In one aspect of the present invention, a thermally conductive holder for holding a heat-generating component comprises a molded article formed from a thermally conductive composition. The thermally conductive molded article includes a proximal end; a distal end wall; a peripheral wall extending therebetween; and a receiving portion that is defined by the distal end wall and the peripheral wall and opens at the proximal end. The receiving portion is a recess being able to receive at least part of the heat-generating component and sized smaller than the at least part of the heat-generating component in at least one dimension. The thermally conductive composition includes a silicone rubber selected from a millable silicone rubber and a liquid silicone rubber; and a thermally conductive filler in a range from 40 to 70 percent by volume with respect to total volume of the silicone rubber and the thermally conductive filler. From 35 to 100 percent by volume of the thermally conductive filler is composed of magnesium oxide of 5 µm or less in average particle size. The thermally conductive molded article has a hardness in a range from 20 to 70 as measured by a TYPE A durometer in conformity with ISO 7619. The thermally conductive molded article has rubber elasticity, which allows elastic deformation thereof. The elastic deformation of the peripheral wall allows the receiving portion to receive the heat-generating component within the recess.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the following paragraphs, an embodiment of the present invention will be described in detail with reference to the accompanying drawings.

Figure 1:
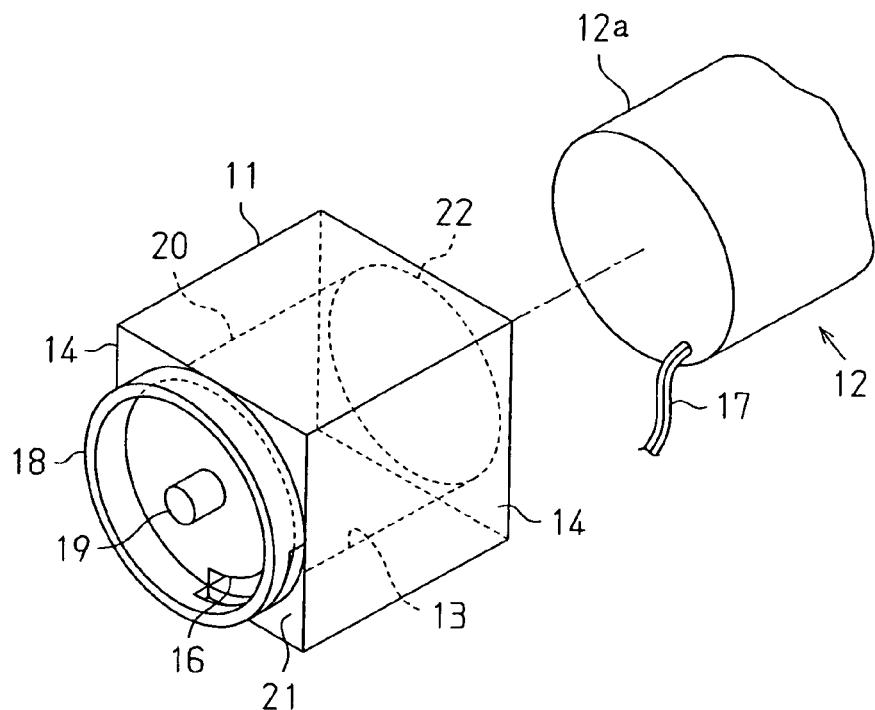
FIG. 1 is a perspective view showing a thermally conductive holder in accordance with one embodiment of the present invention and a battery.
Figure 4:
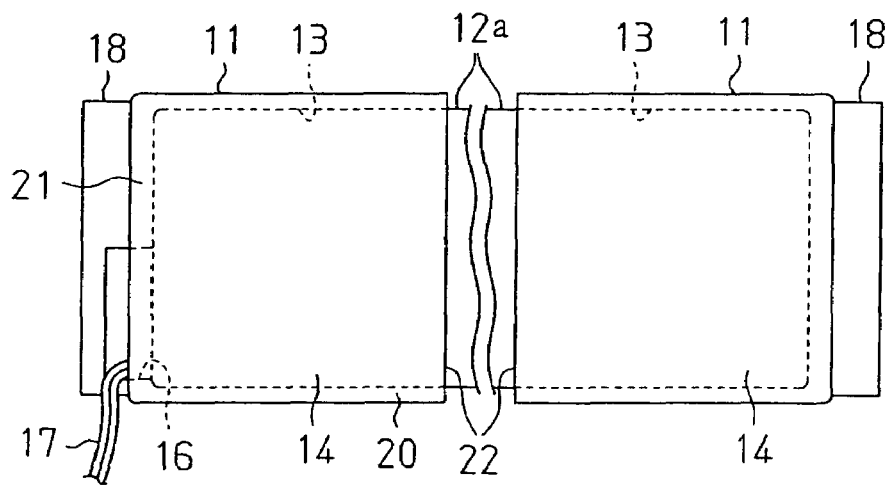
FIG. 4 is a side view of the thermally conductive holder mounted on a battery.

FIGS. 1 and 4 show a thermally conductive holder 11 in accordance with an embodiment of the present invention. In this embodiment, a pair of thermally conductive holders 11 are mounted on both end portions 12a of a battery 12 as a heat-generating component, as shown in FIG. 4. The pair of thermally conductive holders 11 holds the battery 12 while protecting the same against external vibration or impact. The thermally conductive holder 11 is formed from a thermally conductive composition that contains a silicone rubber and a thermally conductive filler. In the thermally conductive composition, the thermally conductive filler is contained in the range of 40 to 70 percent by volume respective to the total volume of the silicone rubber and the thermally conductive filler. From 35 to 100 percent by volume of the thermally conductive filler is composed of magnesium oxide being 5 μm or less on average in particle size. The thermally conductive holder 11 is obtained by solidifying the thermally conductive composition into a desired shape. The hardness (measured by a type A durometer in conformity with ISO 7619) of the thermally conductive holder 11 is in the range of 20 to 70. The thermally conductive holder 11 has rubber elasticity, which allows the elastic deformation thereof for holding the battery 12 as a heat-generating component. For use, the thermally conductive holder 11 can be fixed in a device (not shown) to be equipped with the battery 12.

Figure 3:
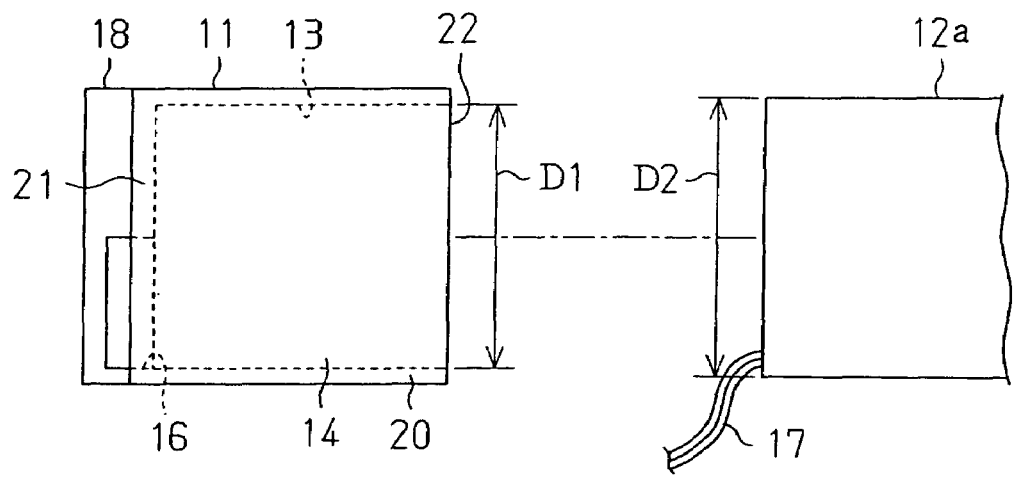
FIG. 3 is a side view showing the thermally conductive holder and a battery.

In this embodiment, the thermally conductive holder 11 has a shape corresponding to a hollow rectangular column, as shown in FIGS. 1 and 3. The thermally conductive holder 11 includes inside a receiving portion, namely a generally cylindrical recess 13 for receiving at least a part of the battery 12. The recess 13 is defined by the peripheral wall 20 and the distal end wall 21 and has an opening 22 on the proximal end of the thermally conductive holder 11. The recess 13 is formed so as to conform to the profile of the cylindrical end portion 12a of the battery 12. The thermally conductive holder 11 is mounted on the battery 12 by fitting the end portion 12a of the battery 12 into the recess 13.

As shown in FIG. 3, the recess 13 is sized smaller than the profile of the end portion 12a of the battery 12 when the thermally conductive holder 11 is not mounted on the battery 12. Specifically, the inside diameter D1 of the recess 13 is designed to be smaller than the outside diameter D2 of the end portion 12a (the portion to be received in the recess 13) of the battery 12. Once the end portion 12a of the battery 12 is inserted in the recess 13, the rubber elasticity of the holder 11 allows the peripheral wall 20 to be elastically deformed so that the recess 13 is expanded radially outwardly. Accordingly, the thermally conductive holder 11 can firmly hold the battery 12 with the outer surface of the end portion 12a closely contacting the inner surface of the recess 13, as shown in FIG. 4. The ratio of the inside diameter D1 to the outside diameter D2 (=D1/D2×100) is preferably in the range of 85 to 95 percent. The ratio of D1 to D2 in such a range enables the thermally conductive holder 11 to be easily mounted on the end portion 12a of the battery 12, and secure better contact between the inner surface of the recess 13 and the outer surface of the end portion 12a of the battery 12.

Figure 2:
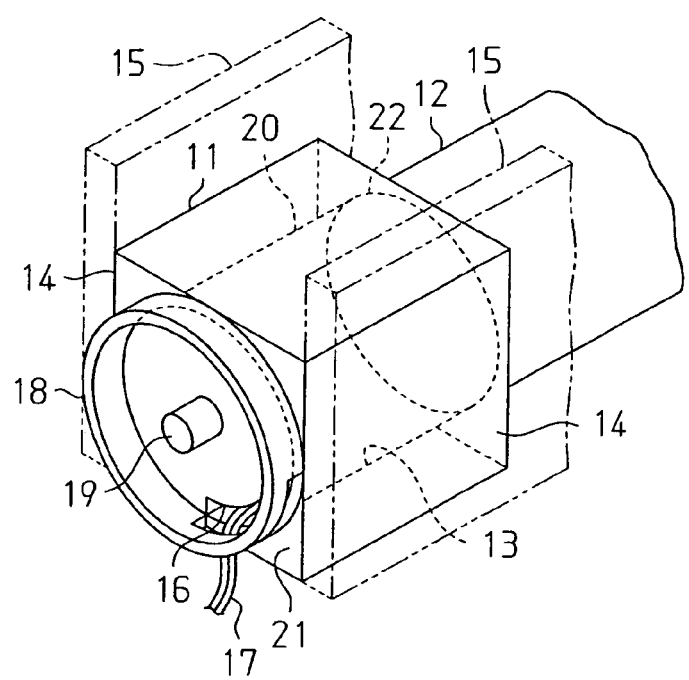
FIG. 2 is a perspective view of the thermally conductive holder mounted on a battery.

The outer sides 14 of the thermally conductive holder 11 form heat-conducting interfaces which conduct heat generated from the battery 12 outside, as shown FIGS. 1 and 2. For example, the thermally conductive holder 11 is held between a pair of flat fixing plates 15, as shown by a chain double-dashed line in FIG. 2, fixed in the inside of the case of any electronic equipment. In this arrangement, two outer sides 14 in opposite to each other, contact the fixing plates 15 to form heat-conducting interfaces therebetween. Accordingly, heat generated from the battery 12 is conducted through the thermally conductive holder 11 via the heat-conducting interfaces to the fixing plates 15, where it is radiated away. The fixing plates 15 preferably comprise a metal material because of the excellent heat radiating properties of metal materials.

Lead wires 17 may be provided on one end of the battery 12, as shown in FIGS. 1-4. The lead wires 17 are for connection of a positive electrode and a negative electrode to the outside. An aperture 16 may be provided through the distal end wall 21 close proximate to the inner surface of the recess 13. Once the end portion 12a of the battery 12 is fitted into the recess 13, the lead wires 17 are led to the outside of the thermally conductive holder 11 through the aperture 16.

The thermally conductive holder also includes a cushion member. More particularly, an annular projection 18 and a cylindrical projection 19 positioned in the center of the annular projection 18 are provided as a such cushion member on the outer surface of the distal end wall 21 of the thermally conductive holder 11. The annular projection 18 and the cylindrical projection 19 may contact the inner surface of a case of any devices equipped with the thermally conductive holder 11 to limit the longitudinal movement of the thermally conductive holder 11. These projections 18, 19 also serve to cushion vibration transmitted from the case to the thermally conductive holder 11 due to their rubber elasticity.

The thermally conductive composition contains a silicone rubber as a matrix so as to provide rubber elasticity to the thermally conductive holder 11. In practical, the silicone rubber contained in the thermally conductive composition maybe a silicone rubber compound in an uncured state. Such uncured silicone rubber compounds are commercially available from various manufacturer. Examples of the silicone rubber compound include millable-type silicone rubber and liquid silicone rubber. The millable-type silicone rubber contains highly polymerized (polymerization degree: about 3000 to 10000) organopolysiloxane in a straight chain as its major ingredient. The name of "millable-type" silicone rubber comes from the fact that this silicone rubber compound can be processed by using a roll mill. For example, a millable-type silicone rubber "SE1120U" is available from Dow Corning Toray Silicone Co., Ltd. The liquid silicone rubber contains low polymerized (polymerization degree: about 100 to 2000) organopolysiloxane as its major ingredient. These silicone rubber compounds typically may further include reinforcing fillers (typically, silica powder) and some additives such as silicone oils. In the millable-type silicone rubber to be used for the present invention, the content of the reinforcing filler maybe preferably 5 to 50 percent by weight in the compound. These silicone rubber compounds are cured to produce solid silicone rubbers using a chemical reaction, such as a crosslinking reaction, condensation reaction or addition reaction, using various curing agents. Curing agents include, for example, crosslinking agents and curing catalysts. Such curing agents may be included in the silicone rubber compound used, or may be added separately. For the millable silicone rubber, for example, peroxides such as benzoyl peroxide can be used as a crosslinking agent.

The thermally conductive composition contains a thermally conductive filler to provide better thermal conductivity to the thermally conductive holder 11. In the thermally conductive composition, the thermally conductive filler is contained in 40 to 70 percent by volume with respect to the total volume of silicone rubber as described above and the thermally conductive filler. Examples of thermally conductive fillers include magnesium oxide, aluminum oxide, aluminum nitride, boron nitride, silicon carbide and aluminum hydroxide. Preferably, the thermally conductive filler maybe electrically insulative to avoid any adverse effects on electrodes or terminals of the heat generating component.

The thermally conductive composition contains, as a thermally conductive filler, at least magnesium oxide being 5 μm or less in average particle size. Magnesium oxide is characterized by excellent thermal conductivity and relatively low hardness among the above described thermally conductive fillers (magnesium oxide has Mohs hardness of 6). Accordingly, magnesiumoxide is unlikely to inhibit the rubber elasticity of the silicone rubber that constitutes the thermally conductive holder 11. More particularly, the use of magnesium oxide being 5 µm or less in average particle size as a thermally conductive filler can provide heat conductivity and rubber elasticity to the thermally conductive holder 11 in a well-balanced manner. The average particle size of magnesium oxide is preferably 4 µm or less and more preferably 3 µm or less. The smaller average particle size of magnesium oxide is more preferable. However, taking into account its handling ability and ease of producing the thermally conductive holder 11, the average particle size of 0.5 µm or more is practical. On the other hand, the use of magnesium oxide more than 5 µm in average particle size makes it difficult to ensure the rubber elasticity of the thermally conductive holder 11. The average particle size herein is the value calculated by a laser diffraction method.

The content of the magnesium oxide of 5 µm or less in average particle size is 35 to 100 percent by volume, preferably 40 to 100 percent by volume, more preferably 45 to 100 percent by volume and still more preferably 60 to 100 percent by volume with respect to the total volume of the thermally conductive filler. If the content is less than 35 percent by volume, it is impossible to ensure the rubber elasticity of the resultant thermally conductive holder. Setting the content of the magnesium oxide to 5 µm or less in average particle size in the thermally conductive filler as in the above preferable range can ensure the rubber elasticity of the thermally conductive holder 11 to be obtained and provide excellent thermal conductivity to the same.

In the thermally conductive composition, the content of the thermally conductive filler with respect to the total volume of the silicone rubber and the thermally conductive filler is 40 to 70 percent by volume, preferably 45 to 65 percent by volume and more preferably 50 to 60 percent by volume. If the content of the thermally conductive filler is less than 40 percent by volume, it is impossible to provide sufficient thermal conductivity to the thermally conductive holder 11. On the other hand, if the content is more than 70 percent by volume, it is impossible to ensure the rubber elasticity of the resultant thermally conductive holder 11.

Any additional thermally conductive fillers other than magnesium oxide may be added into the thermally conductive composition. In this case, it is preferable to add aluminum hydroxide as the additional thermally conductive filler, because aluminum hydroxide has low hardness, which allows the rubber elasticity of the resultant thermally conductive holder 11 to be ensured. Further, when using a thermally conductive filler other than magnesium oxide of 5 µm or less in average particle size, the average particle size of the thermally conductive filler to be used is preferably 20 µm or less. If the average particle size of the thermally conductive filler is 20 µm or less, the dispersibility of the filler into the silicone rubber can be improved. Even if the thermally conductive filler is removed due to friction or the like from the surface of the thermally conductive holder 11, such a thermally conductive filler is unlikely to cause malfunction in the electronic components around the thermally conductive holder 11 because of the small particle size thereof.

The thermally conductive composition may contain additives such as plasticizers, tackifiers, reinforcing agents, colorants, flame retardants and heat-resistance improvers, if necessary.

The thermally conductive holder 11 is obtained by curing the thermally conductive composition. The thermally conductive holder 11 has a hardness of 20 to 70, preferably 25 to 65 and more preferably 30 to 60. This hardness means the value as determined with a type A durometer in conformity a International Standard, ISO 7619, established by International Organization for Standardization. If the hardness is less than 20, the peripheral wall 20 of the thermally conductive holder 11 cannot hold the battery 12 sufficiently. In addition, when fitting the end portion 12a of the battery 12 into the recess 13, the thermally conductive holder 11 can be broken. On the other hand, if the hardness of the thermally conductive holder 11 is more than 70, the rubber elasticity of the thermally conductive holder 11 is not enough, causing difficulty in the mounting of the thermally conductive holder 11 onto the battery 12. Further, the cushioning effect of the thermally conductive holder 11 is lowered, whereby the thermally conductive holder 11 may be unable to protect the battery 12 from external vibration, impact, and the like.

The thermal conductivity of the thermally conductive holder 11 is preferably 0.4 W/(m·K) or more, more preferably 0.6 W/(m·K) or more and much more preferably 0.8 W/(m·K) or more. If the thermal conductivity is less than 0.4 W/(m·K), the thermally conductive holder 11 may not conduct heat effectively. This results in accumulated heat in the battery 12, there by being likely to degrade the performance of the battery 12. The higher thermal conductivity of the thermally conductive holder 11 is preferable. However, taking into account the characteristics of silicone rubber and the thermally conductive fillers, the thermal conductivity may be 30 W/(m·K) or less.

In the following, a process for producing the thermally conductive holder 11 will be described.

The process for producing the thermally conductive holder 11 includes a kneading step for preparing a thermally conductive composition; and a molding step for molding the thermally conductive composition.

In the kneading step, a silicone rubber, a thermally conductive filler, a curing agent and additional additives are fed into a kneading machine, and the ingredients are mixed and kneaded to prepare a thermally conductive composition. As the kneading machine, a kneader or a roll mill can be used. If necessary, a de-aeration step may be added to remove air bubbles in the resultant thermally conductive composition. In the thermally conductive composition, the amount of the thermally conductive filler mixed is preferably 300 to 700 parts by weight, more preferably 350 to 650 parts by weight, much more preferably 350 to 600 parts by weight and still more preferably 400 to 600 parts by weight per 100 parts by weight, respective to 100 parts by weight of the silicone rubber. If the amount of the thermally conductive filler mixed is less than 300 parts by weight, with respect to 100 parts by weight of silicone rubber, excellent thermal conductivity may not be achieved in the thermally conductive holder 11, whereas if the amount of the thermally conductive filler mixed is more than 700 parts by weight, the moldability of the thermally conductive composition may deteriorate. The amount of the magnesium oxide of 5 µm or less in average particle size is preferably 55 to 100 percent by weight, more preferably 60 to 100 percent by weight and much more preferably 70 to 100 percent by weight in the thermally conductive filler. If this amount is less than 55 percent by weight, the moldability of the thermally conductive composition may deteriorate.

In the molding step, the thermally conductive composition is fed into a mold, shaped into a desired shape, and solidified by curing the silicone rubber contained in it. This molding step allows the thermally conductive holder 11 to be formed integrally. When solidifying the thermally conductive composition in this molding step, it is preferable to heat the mold to appropriate temperatures depending on the types of the silicone rubber and the curing agent used.

To mount the thermally conductive holder 11 to the battery 12, the end portion 12a of the battery 12 is fitted into the recess 13. The thermally conductive holder 11 formed from the thermally conductive composition as described above can have a hardness of 20 to 70 (measured by type A durometer, in conformity with ISO 7619) and rubber elasticity. Therefore, the recess 13 is easily expanded radially outwardly due to elastic deformation of the peripheral wall 20 utilizing the rubber elasticity, such that the end portion 12a of the battery 12 can be easily fitted into the recess 13. Further, the contact between the inner surface of the peripheral wall 20, which defines the recess 13, and the outer surface of the battery 12 can be improved utilizing the rubber elasticity of the thermally conductive holder 11.

Then, the thermally conductive holder 11 mounted on the battery 12 may be installed into a device to be equipped with the battery 12. For example, the thermally conductive holder 11 mounted on the battery 12 may be held between the two fixing plates 15 fixed in a case of electronic equipment so that the outer sides 14 and the fixing plates 15 are in contact with each other. Thus, the battery 12 is secured in the inside of the case. In this case, the thermally conductive holder 11 can be easily held between the two fixing plates 15 utilizing the elastic deformation of the holder 11.

Once electronic equipment equipped with the battery 12 held by the thermally conductive holder 11 is used, heat generated from the battery 12 is conducted to the thermally conductive holder 11. The thermally conductive holder 11 has a high thermal conductivity because it is formed from the thermally conductive composition described above. Besides, the contact between the inner surface of the peripheral wall 20 of the recess 13 and the outer surface of the battery 12 is secured. Consequently, heat generated from the battery 12 is efficiently conducted to the thermally conductive holder 11. Furthermore, the outer sides 14 of the thermally conductive holder 11 together with the fixing plates 15 form relatively wide heat-conducting interfaces. This allows heat generated from the battery 12 to efficiently conduct to the fixing plates 15 through the thermally conductive holder 11.

Advantages achieved by this embodiment will be described as below.

In the embodiment described above, the thermally conductive holder 11 is molded from a thermally conductive composition. The thermally conductive composition contains a silicone rubber and a thermally conductive filler in 40 to 70 percent by volume with respect to the total volume of silicone rubber and thermally conductive filler. From 35 to 100 percent by volume of the thermally conductive filler is magnesium oxide being 5 μm or less in average particle size. The hardness of the thermally conductive holder 11 obtained by solidifying the thermally conductive composition is in the range of 20 to 70. In such a configuration, the resultant thermally conductive holder 11 has improved thermal conductivity and ensured rubber elasticity. As a result, the thermally conductive holder 11 can achieve the effective conduct of heat generated from a heat-generating component such as the battery 12 and easy mounting on the battery 12. The thermally conductive holder 11 can reliably hold the battery 12 due to its rubber elasticity. Further, the thermally conductive holder 11 can effectively cushion vibration, impact, and the like from the outside, and thereby protect the battery 12.

In the embodiment, the inside diameter D1 of the recess 13 of the thermally conductive holder 11 is sized smaller than the outside diameter D2 of the end portion 12a of the battery 12 when the thermally conductive holder 11 is not mounted on the battery 12. Forming the inner profile of the recess 13 smaller than the outer profile of the battery 12 further improves the contact between the inner surface of the recess 13 and the outer surface of the battery 12. Thus, the heat generated from the battery 12 is efficiently conducted to the thermally conductive holder 11. This facilitates the ability of the thermally conductive holder 11 to exert excellent thermal conductivity.

In the embodiment, the thermally conductive holder 11 is constructed so that its outer sides 14 come in face-to-face contact with the fixing plates 15 to form heat-conducting interfaces. Such construction can advantageously ensure a heat-conducting area, which conducts heat, and conduct the heat from the thermally conductive holder 11 to the fixing plates 15 efficiently. Thus, the thermally conductive holder 11 can exert excellent thermal conductivity more effectively.

In a thermally conductive holder 11 in accordance with this embodiment, the thermal conductivity is preferably 0.4 W/(m·K) or more. In this case, the thermally conductive holder 11 can exert more excellent thermal conductivity.

In the embodiment, the thermally conductive composition contains magnesium oxide of 5 μm or less in average particle size as thermally conductive filler, whereby it can be provided with viscoelastic properties suitable for molding. Thus the thermally conductive composition can have excellent moldability. As a result, thermally conductive holders 11 having complicated shapes can be easily produced from the thermally conductive composition.

It should be apparent to those skilled in the art that the present invention can be embodied in many other specific forms without departing from the spirit or scope of the invention. More particularly, it should be understood that the invention may be. embodied in the following forms.

The shape of the recess 13 may be changed to other shapes such as rectangular column according to the shape of the heat-generating component. In the thermally conductive holder 11, the portion receiving the heat-generating component is not limited to a recess, but may be a cutout that is constructed so as to hold the heat-generating component therebetween.

The thermally conductive holder 11 may be constructed so that a single thermally conductive holder 11 holds the battery 12 or three or more thermally conductive holders 11 hold the same. When the lead wires 17 need not be led to the outside via the thermally conductive holder 11, the aperture 16 need not be provided in the thermally conductive holder 11.

The outer surface of the distal end wall 21 of the thermally conductive holder 11 may be flat, instead of providing an annular projection 18 and a cylindrical projection 19.

The thermally conductive holder 11 may be secured in the inside of the case while contacting the outer sides 14 with the inner surface of the case to form a heat conducting interface therebetween, instead of using the fixing plates 15.

The thermally conductive holder 11 is applicable not only to batteries, but also to other heat-generating components in electronic equipment, such as motors, lamps for liquid crystal displays, and the like. The use of a thermally conductive holder 11 in such applications enables heat generated from heating components, such as motors, to be efficiently released, increasing the life of such components.

In an application where a heat-generating component requires electrical connection through the thermally conductive holder 11 with another member, such as a printed board, of a device to be equipped with the holder 11 and the heat-generating component, the thermally conductive holder 11 may be provided with at least one electrically conductive connector. This can eliminate use of the lead wires 17 for the heat generating components.

More particularly, at least one electrically conductive connector may be disposed through the peripheral wall 20 or the distal end wall 21 of the thermally conductive holder 11. The thermally conductive holder 11 is placed in the device such that the electrically conductive connectors contact, for example, electrodes of the printed board. As a result, electrodes of the heat-generating component held by the thermally conductive holder are electrically connected to the electrodes of the printed board through the electrically conductive connectors.

Examples of such a electrically conductive connector includes a connector comprising metal pin or spring terminals arranged in a case made of a resin, and an electrically conductive rubber connector.

Figure 5:
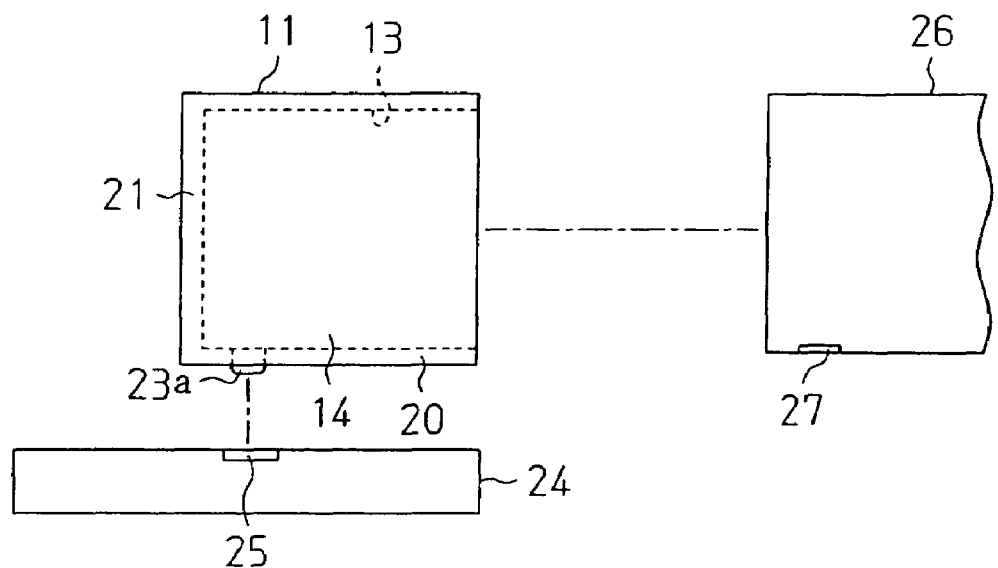
FIG. 5 is a side view showing a thermally conductive holder in accordance with another embodiment of the present invention.
Figure 6:
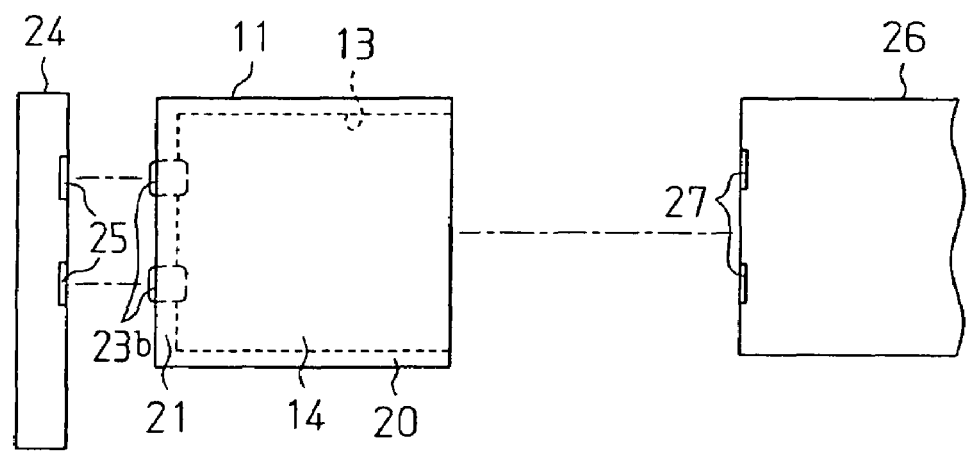
FIG. 6 is a side view showing a thermally conductive holder in accordance with yet another embodiment of the present invention.
Figure 7:
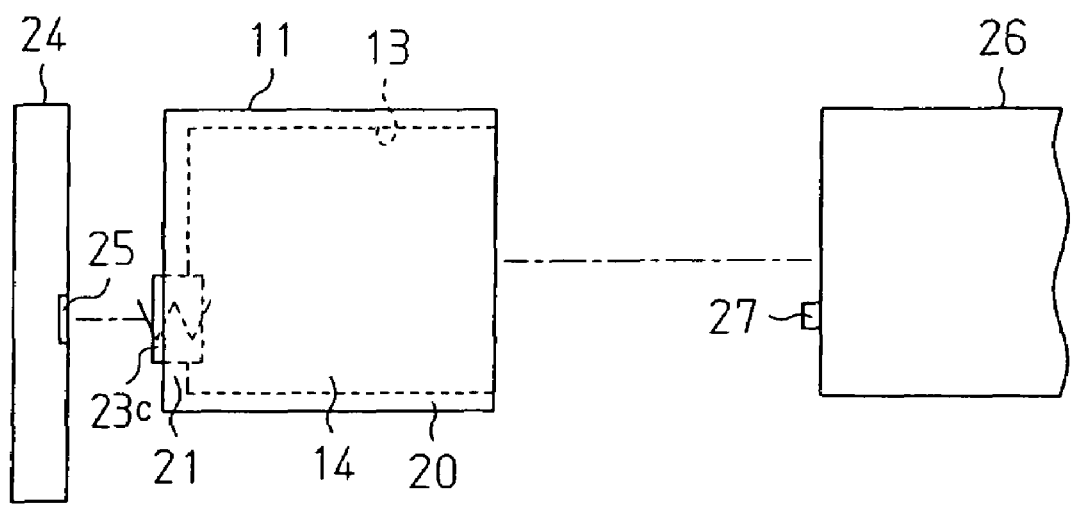
FIG. 7 is a side view showing a thermally conductive holder in accordance with still another embodiment of the present invention.

FIGS. 5 to 7 show some embodiments of a thermally conductive holder 11 having such electrically conductive connector(s). The thermally conductive holder 11 shown in FIG. 5 is provided with an electrically conductive connector 23a in a generally cylindrical shape. The electrically conductive connector 23a is integrally formed with the holder 11 and extends through the peripheral wall 20 in a position so as to face the electrode 27 of the heat-generating component 26 when the holder 11 is mounted on the heat-generating component 26. The electrically conductive connector 23a maybe made of any electrically conductive materials. The electrically conductive connector 23a at one end preferably projects outward from the peripheral wall 20. This can ensure better contact between the connector 23a and an electrode 25 of a printed board 24. The thermally conductive holder 11 is mounted on the heat-generating component 26 with the connector 23a contacting the electrode 27 of the heat-generating component 26. Then, the thermally conductive holder 11 is placed in a device (not shown) such that the connector 23a is compressed by the electrodes 25, 27. Thus, an electrical connection between the electrode 25 of the printed board 24 of the device and the electrode 27 of the heat-generating component 26 held by the thermally conductive holder 11 can be established through the electrically conductive connector 23a.

In another embodiment shown in FIG. 6, a thermally conductive holder 11 is provided with a pair of electrically conductive rubber connectors 23b integrally formed therewith and extending through the distal end wall 21. The rubber connectors 23b preferably projects out from the both sides of the peripheral wall 20. This can ensure better contact between the rubber connectors 23b and electrodes 25 of the printed board 24 and the electrodes 27 of the heat-generating component 26. The thermally conductive holder 11 is also placed in the device such that the rubber connectors 23b are compressed by a pair of the electrodes 27 provided on the end of the heat-generating component 26 and a corresponding pair of the electrodes 25 of the printed board 24. Thereby, an electrical connection between the electrodes 25 and 27 can be established through the rubber connectors 23b. The electrically conductive rubber connector 23b is an elastic member having electrically conductive properties. The electrically conductive rubber connector 23b may be made of an elastic material including any electrically conductive media such as metal powders, metal wires or carbon powders. It is preferable that the elastic material be a silicone rubber.

In another embodiment shown in FIG. 7, a thermally conductive holder 11 is provided with an electrically conductive connector 23c disposed through the distal end wall 21. The electrically conductive connector 23c comprises a metal spring terminal arranged in a resin case. The electrically conductive connector 23c preferably projects out from both sides of the peripheral wall 20. This can ensure better contact between the connector 23c and the electrode 25 of the printed board 24 and the electrode 27 of the heat-generating component 26. This thermally conductive holder 11 is also placed in a device such that the connector 23c is compressed by the electrodes 25 of the printed board 24 and the electrode 27 of the heat-generating component 26. Thereby, an electrical connection between these electrodes 25 and 27 can be established through the electrically conductive connector 23c.

The electrically conductive connector in each embodiment may be integrated with the thermally conductive holder 11. Such integration may be achieved by embedding the electrically conductive connectors, which are separately formed, in the peripheral wall 20 or the distal end wall 21 of the thermally conductive holder 11 or by integrally molding the connectors with the thermally conductive holder using a mold.

EXAMPLES

The above described embodiment will be described in further detail with several examples and comparative examples.

Examples 1 to 5, Comparative Examples 1 to 5

Millable silicone rubber ("SE1120U" manufactured by Dow Corning Toray Silicone Co., Ltd; specific gravity of 1.00) as a silicone rubber, magnesium oxide (true specific gravity of 3.58) as a thermally conductive filler, and optionally, aluminum hydroxide (true specific gravity 2.20, average particle size 1.1 µm) were mixed in the mixing ratios shown in Table 1 and Table 2. To the mixture was added a peroxide crosslinking agent as a crosslinking agent. Then the mixture was mixed and kneaded with a roll mill, until the ingredients were dispersed uniformly, to yield a thermally conductive composition.

For the thermally conductive compositions of examples 1 to 5 and comparative examples 1 to 5, (A) the ratio of the thermally conductive filler with respect to the total volume of the silicone rubber and the thermally conductive filler [percent by volume] (hereinafter, referred to as ratio of (A)) and (B) the ratio of the magnesium oxide of 5 µm or less in average particle size respective to the total volume of the thermally conductive filler [percent by volume] (hereinafter, referred to as ratio of (B)) are shown in Table 1 and Table 2.

Each of the resultant thermally conductive compositions was fed into a mold and kept at 175° C. for 10 minutes, thereby being molded into a desired shape. Thus thermally conductive holders 11 were obtained. In the resultant thermally conductive holders 11, the ratio of the inside diameter D1 of the recess 13 to the outside diameter D2 of the battery 12 was 90 percent. Each of the resultant thermally conductive holders 11 was evaluated as to moldability based on three factors: mold releasability, surface conditions and dimensional stability. The results were classified into 3 grades as shown below. The results are shown in Table 1 and Table 2.

Mold releasability, surface conditions and dimensional stability are all satisfactory: GOOD Any one of mold releasability, surface conditions and dimensional stability is not satisfactory: POOR None of mold releasability, surface conditions and dimensional stability are satisfactory: BAD The hardness of each thermally conductive holder 11 was determined with a type A durometer in accordance with ISO 7619. To determine the thermal conductivity of the thermally conductive holders 11, test pieces of 2 mm thick sheets were prepared by molding each of the thermally conductive compositions obtained in the examples and the comparative examples using a mold heat at 170° C. for 10 minutes. The thermal conductivity of each test piece was determined with the Quick Thermal Conductivity Meter (Model QTM-500, manufactured by Kyoto Electronics Manufacturing Co., Ltd.,). The measurements of the hardness and the thermal conductivity are shown in Table 1 and Table 2.

The workability of each thermally conductive holder 11 when it was mounted on the battery 12 was evaluated according to the following classifications.

The thermally conductive holder 11 showed excellent rubber elasticity, no malfunction such as breakage was caused in the holder 11, and the holder 11 was easy to mount on the battery 12: GOOD The rubber elasticity of the thermally conductive holder 11 was not enough and the thermally conductive holder 11 was a little difficult to mount on the battery 12: POOR Damage such as cracking occurred in the thermally conductive holder 11 and the thermally conductive holder 11 was difficult to mount on the battery 12: BAD The results of this evaluation are also shown in Table 1 and Table 2.

TABLE 1

| | | Examples | | | | |
|---|---|---|---|---|---|---|
| | | 1 | 2 | 3 | 4 | 5 |
| Composition (parts by weight) | Millable silicone rubber | 100 | 100 | 100 | 100 | 100 |
| | Magnesium oxide (Ave. p. s.: 3 μm) | 300 | 400 | 600 | 400 | 200 |
| | Aluminum hydroxide | 100 | — | — | 150 | 150 |
| | Crosslinking agent | 0.8 | 0.8 | 0.8 | 0.8 | 0.8 |
| Ratio of (A) [percent by volume] | | 56 | 56 | 63 | 64 | 55 |
| Ratio of (B) [percent by volume] | | 65 | 100 | 100 | 62 | 45 |
| Moldability | | GOOD | GOOD | GOOD | GOOD | GOOD |
| Hardness (Type A durometer, ISO 7619) | | 46 | 36 | 47 | 58 | 52 |
| Thermal conductivity [W/(m · k)] | | 0.8 | 0.9 | 1.7 | 1.5 | 1.4 |
| Workability when mounted | | GOOD | GOOD | GOOD | GOOD | GOOD |

TABLE 2

| | | Comparative Examples | | | | |
|---|---|---|---|---|---|---|
| | | 1 | 2 | 3 | 4 | 5 |
| Composition (parts by weight) | Millable silicone rubber | 100 | 100 | 100 | 100 | 100 |
| | Magnesium oxides | | | | | |
| | Ave. p. s.: 3 μm | — | — | 200 | 600 | 150 |
| | Ave. p. s.: 6 μm | 300 | — | — | — | — |
| | Ave. p. s.: 13 μm | — | 300 | — | — | — |
| | Aluminum hydroxide | 100 | 100 | — | 150 | 250 |
| | Crosslinking agent | 0.8 | 0.8 | 0.8 | 0.8 | 0.8 |
| Ratio of (A) [percent by volume] | | 56 | 56 | 36 | 70 | 61 |
| Ratio of (B) [percent by volume] | | — | — | 100 | 71 | 27 |
| Moldability | | POOR | BAD | GOOD | POOR | POOR |
| Hardness (Type A durometer, ISO 7619) | | 45 | 42 | 28 | 71 | 31 |
| Thermal conductivity [W/(m · k)] | | 0.7 | 0.8 | 0.2 | 2.1 | 0.5 |
| Workability when mounted | | POOR | BAD | POOR | BAD | POOR |

As is apparent from the results shown in Table 1, the moldability of the thermally conductive compositions of examples 1 to 5 was GOOD. In each example, high thermal conductivity of 0.4 W/(m·K) or more was achieved. Further, the thermally conductive holder 11 of each example had GOOD mounting workability without any breakage when mounted on the battery 12. This may be because the thermally conductive holder 11 of each example was formed of the thermally conductive composition in which the ratio of (A) was 40 to 70 percent by volume and the ratio of (B) was 35 to 100 percent by volume, and thus the rubber elasticity of the thermally conductive holder 11 was ensured and sufficient extension and tear strength of the same could be obtained. The hardness of the thermally conductive holder 11 of each example was in the range of 20 to 70. Probably GOOD mounting workability was obtained due to the mutual relation among the extension, tear strength and hardness of the thermally conductive holder 11.

In contrast, as is apparent from the results shown in Table 2, in the thermally conductive holders 11 of comparative examples 1 and 2, mounting workability was POOR or BAD. These thermally conductive holders 11 contained magnesium oxide greater than 5 μm in average particle size as a thermally conductive filler. This probably made it impossible to ensure sufficient rubber elasticity of the thermally conductive holders 11 and achieve sufficient extension and tear strength of the same. In comparative example 3, the low thermal conductivity of the thermally conductive holder 11 is attributed to the fact that the ratio of (A) was less than 40 percent by volume. In comparative example 4, the POOR mounting workability of the thermally conductive holder 11 is attributed to the fact that its hardness was greater than 70. In comparative example 5, the POOR moldability and mounting workability of the thermally conductive holder 11 is attributed to the fact that the ratio of (B) was less than 35 percent by volume.

The invention claimed is:

1. A thermally conductive holder for holding a heat-generating component, the thermally conductive holder comprising a material formed from a thermally conductive composition, the thermally conductive composition including:
   a silicone rubber; and
   a thermally conductive filler in a range of 40 to 70 percent by volume with respect to total volume of the silicone rubber and the thermally conductive filler, wherein from 35 to 100 percent by volume of the thermally conductive filler is composed of magnesium oxide of 5 μm or less in average particle size;
   wherein said material has a hardness in a range of 20 to 70 as measured by a Type A durometer, and has a rubber elasticity, thereby allowing elastic deformation thereof;
   wherein the holder further comprises:
   a proximal end,
   a distal end wall,
   a peripheral wall extending therebetween, and
   a receiving portion that is defined by the distal end wall and the peripheral wall and opens at the proximal end,
   wherein the receiving portion is a recess being able to receive at least a part of the heat-generating component and sized smaller than said at least a part of the heat-generating component in at least one dimension, and
   wherein elastic deformation of the peripheral wall allows the receiving portion to receive the heat-generating component within the recess,
   wherein the at least part of the heat-generating component is generally cylindrical in shape and the receiving portion is a generally cylindrical recess, and wherein the receiving portion is sized such that a ratio of an inside diameter of the receiving portion to an outside diameter of the at least part of the heat-generating component is in a range from 85 to 95 percent.

2. The thermally conductive holder according to claim 1, wherein, for use, the thermally conductive holder is fixed in a device to be equipped with the heat-generating component, and wherein the thermally conductive holder contacts a part of the device to form a heat conducting interface.

3. The thermally conductive holder according to claim 2, wherein the part of the device is a case of the device.

4. The thermally conductive holder according to claim 2, wherein the part of the device is a fitting for fixing the thermally conductive holder into the device.

5. The thermally conductive holder according to claim 1, wherein the thermally conductive holder has a thermal conductivity of 0.4 W/(m·K) or higher.

6. The thermally conductive holder according to claim 1, wherein the heat-generating component is a battery.

7. A thermally conductive holder for holding a heat-generating component, the thermally conductive holder comprising a material formed from a thermally conductive composition, the thermally conductive composition including:
   a silicone rubber; and
   a thermally conductive filler in a range of 40 to 70 percent by volume with respect to total volume of the silicone rubber and the thermally conductive filler, wherein from 35 to 100 percent by volume of the thermally conductive filler is composed of magnesium oxide of 5 μm or less in average particle size;
   wherein said material has a hardness in a range of 20 to 70 as measured by a Type A durometer, and has a rubber elasticity, thereby allowing elastic deformation thereof;
   wherein the holder further comprises:
   a proximal end,
   a distal end wall,
   a peripheral wall extending therebetween, and
   a receiving portion that is defined by the distal end wall and the peripheral wall and opens at the proximal end,
   wherein the receiving portion is a recess being able to receive at least a part of the heat-generating component and sized smaller than said at least a part of the heat-generating component in at least one dimension, and
   wherein elastic deformation of the peripheral wall allows the receiving portion to receive the heat-generating component within the recess,
   wherein the distal end wall has an outer surface, on which a cushion member is provided.

8. The thermally conductive holder according to claim 7, wherein the cushion member includes an annular projection and a cylindrical projection positioned in the center of the annular projection.

9. A thermally conductive holder for holding a heat-generating component, the thermally conductive holder comprising a material formed from a thermally conductive composition, the thermally conductive composition including:
   a silicone rubber; and
   a thermally conductive filler in a range of 40 to 70 percent by volume with respect to total volume of the silicone rubber and the thermally conductive filler, wherein from 35 to 100 percent by volume of the thermally conductive filler is composed of magnesium oxide of 5 µm or less in average particle size;

wherein said material has a hardness in a range of 20 to 70 as measured by a Type A durometer, and has a rubber elasticity, thereby allowing elastic deformation thereof;

wherein the holder further comprises:
a proximal end,
a distal end wall,
a peripheral wall extending therebetween, and
a receiving portion that is defined by the distal end wall and the peripheral wall and opens at the proximal end, wherein the receiving portion is a recess being able to receive at least a part of the heat-generating component and sized smaller than said at least a part of the heat-generating component in at least one dimension, and wherein elastic deformation of the peripheral wall allows the receiving portion to receive the heat-generating component within the recess, wherein the heat-generating component has a lead wire, and wherein the distal end wall has an aperture to pass the lead wire therethrough.

10. A thermally conductive holder for holding a heat-generating component, the thermally conductive holder comprising a material formed from a thermally conductive composition, the thermally conductive composition including:
a silicone rubber; and
a thermally conductive filler in a range of 40 to 70 percent by volume with respect to total volume of the silicone rubber and the thermally conductive filler, wherein from 35 to 100 percent by volume of the thermally conductive filler is composed of magnesium oxide of 5 µm or less in average particle size;

wherein said material has a hardness in a range of 20 to 70 as measured by a Type A durometer, and has a rubber elasticity, thereby allowing elastic deformation thereof;

wherein the holder further comprises:
a proximal end,
a distal end wall,
a peripheral wall extending therebetween, and
a receiving portion that is defined by the distal end wall and the peripheral wall and opens at the proximal end, wherein the receiving portion is a recess being able to receive at least a part of the heat-generating component and sized smaller than said at least a part of the heat-generating component in at least one dimension, and wherein elastic deformation of the peripheral wall allows the receiving portion to receive the heat-generating component within the recess, wherein the heat-generating component has an electrode portion, and wherein the thermally conductive holder further comprises an electrically conductive connector corresponding to the electrode portion.

11. A thermally conductive holder for holding a heat-generating component, the thermally conductive holder comprising a molded article formed from a thermally conductive composition, the thermally conductive molded article including:
a proximal end;
a distal end wall;
a peripheral wall extending therebetween; and
a receiving portion that is defined by the distal end wall and the peripheral wall and opens at the proximal end, wherein the receiving portion is a recess being able to receive at least part of the heat-generating component and sized smaller than the at least part of the heat-generating component in at least one dimension;

wherein the thermally conductive composition includes:
a silicone rubber selected from a millable silicone rubber and a liquid silicone rubber; and
a thermally conductive filler in a range from 40 to 70 percent by volume with respect to total volume of the silicone rubber and the thermally conductive filler, wherein from 35 to 100 percent by volume of the thermally conductive filler is composed of magnesium oxide of 5 µm or less in average particle size, and wherein the thermally conductive molded article has a hardness in a range from 20 to 70 as measured by a Type A durometer;

wherein the thermally conductive molded article has rubber elasticity, which allows elastic deformation thereof, and the elastic deformation of the peripheral wall allows the receiving portion to receive the heat-generating component within the recess, wherein the at least part of the heat-generating component is generally cylindrical in shape and the receiving portion is a generally cylindrical recess, and wherein the receiving portion is sized such that a ratio of an inside diameter of the receiving portion to an outside diameter of the at least part of the heat-generating component is in a range from 85 to 95 percent.

12. The thermally conductive holder according to claim 11, wherein, for use, the thermally conductive holder is fixed in a device to be equipped with the heat-generating component, and wherein the thermally conductive molded article contacts a part of the device to form a heat conducting interface.

13. The thermally conductive holder according to claim 11, wherein the thermally conductive molded article has a thermal conductivity of 0.4 W/(m·K) or higher.

14. The thermally conductive holder according to claim 11, wherein the heat-generating component is a battery.

15. A thermally conductive holder for holding a heat-generating component, the thermally conductive holder comprising a molded article formed from a thermally conductive composition, the thermally conductive molded article including:
a proximal end;
a distal end walk;
a peripheral wall extending therebetween; and
a receiving portion that is defined by the distal end wall and the peripheral wall and opens at the proximal end, wherein the receiving portion is a recess being able to receive at least part of the heat-generating component and sized smaller than the at least part of the heat-generating component in at least one dimension;

wherein the thermally conductive composition includes:
a silicone rubber selected from a millable silicone rubber and a liquid silicone rubber; and
a thermally conductive filler in a range from 40 to 70 percent by volume with respect to total volume of the silicone rubber and the thermally conductive filler, wherein from 35 to 100 percent by volume of the thermally conductive filler is composed of magnesium oxide of 5 µm or less in average particle size, and wherein the thermally conductive molded article has a hardness in a range from 20 to 70 as measured by a Type A durometer;

wherein the thermally conductive molded article has rubber elasticity, which allows elastic deformation thereof, and the elastic deformation of the peripheral wall allows the receiving portion to receive the heat-generating component within the recess, wherein the distal end wall has an outer surface, on which a cushion member is provided.

16. The thermally conductive holder according to claim 15, wherein the cushion member includes an annular projection and a cylindrical projection positioned in the center of the annular projection.

17. A thermally conductive holder for holding a heat-generating component, the thermally conductive holder comprising a molded article formed from a thermally conductive composition, the thermally conductive molded article including:
   a proximal end; a distal end wall;
   a peripheral wall extending therebetween; and
   a receiving portion that is defined by the distal end wall and the peripheral wall and opens at the proximal end, wherein the receiving portion is a recess being able to receive at least part of the heat-generating component and sized smaller than the at least part of the heat-generating component in at least one dimension;
   wherein the thermally conductive composition includes:
   a silicone rubber selected from a millable silicone rubber and a liquid silicone rubber; and
   a thermally conductive filler in a range from 40 to 70 percent by volume with respect to total volume of the silicone rubber and the thermally conductive filler, wherein from 35 to 100 percent by volume of the thermally conductive filler is composed of magnesium oxide of 5 µm or less in average particle size, and wherein the thermally conductive molded article has a hardness in a range from 20 to 70 as measured by a Type A durometer;
   wherein the thermally conductive molded article has rubber elasticity, which allows elastic deformation thereof, and the elastic deformation of the peripheral wall allows the receiving portion to receive the heat-generating component within the recess,
   wherein the heat-generating component has a lead wire, and wherein the distal end wall has an aperture to pass the lead wire therethrough.

18. A thermally conductive holder for holding a heat-generating component, the thermally conductive holder comprising a molded article formed from a thermally conductive composition, the thermally conductive molded article including:
   a proximal end;
   a distal end wall;
   a peripheral wall extending therebetween; and
   a receiving portion that is defined by the distal end wall and the peripheral wall and opens at the proximal end, wherein the receiving portion is a recess being able to receive at least part of the heat-generating component and sized smaller than the at least part of the heat-generating component in at least one dimension;
   wherein the thermally conductive composition includes:
   a silicone rubber selected from a millable silicone rubber and a liquid silicone rubber; and
   a thermally conductive filler in a range from 40 to 70 percent by volume with respect to total volume of the silicone rubber and the thermally conductive filler, wherein from 35 to 100 percent by volume of the thermally conductive filler is composed of magnesium oxide of 5 µm or less in average particle size, and wherein the thermally conductive molded article has a hardness in a range from 20 to 70 as measured by a Type A durometer;
   wherein the thermally conductive molded article has rubber elasticity, which allows elastic deformation thereof, and the elastic deformation of the peripheral wall allows the receiving portion to receive the heat-generating component within the recess,
   wherein the heat-generating component has an electrode portion, and wherein the thermally conductive holder further comprises at least one electrically conductive connector to be electrically connected to the electrode portion.

* * * * *

UNITED STATES PATENT AND TRADEMARK OFFICE
CERTIFICATE OF CORRECTION

PATENT NO.        : 7,324,343 B2                                          Page 1 of 1
APPLICATION NO. : 10/894522
DATED             : January 29, 2008
INVENTOR(S)       : Kouya Takahashi It is certified that error appears in the above-identified patent and that said Letters Patent is hereby corrected as shown below:

Column 16
Line 48, delete "walk", and insert therefor -- wall --.

Signed and Sealed this

Twenty-fourth Day of June, 2008

JON W. DUDAS
*Director of the United States Patent and Trademark Office*